(12) United States Patent
Yang et al.

(10) Patent No.: US 12,411,968 B2
(45) Date of Patent: Sep. 9, 2025

(54) CALCULATION SYSTEM, CALCULATION METHOD, AND INFORMATION STORAGE MEDIUM

(71) Applicant: RAKUTEN GROUP, INC., Tokyo (JP)

(72) Inventors: Bin Yang, Tokyo (JP); Young Joo Chung, San Mateo, CA (US)

(73) Assignee: RAKUTEN GROUP, INC., Tokyo (JP)

( * ) Notice: Subject to any disclaimer, the term of this patent is extended or adjusted under 35 U.S.C. 154(b) by 267 days.

(21) Appl. No.: 18/129,037

(22) Filed: Mar. 30, 2023

(65) Prior Publication Data

US 2024/0330493 A1  Oct. 3, 2024

(51) Int. Cl.
*G06F 21/00* (2013.01)
*G06F 21/62* (2013.01)

(52) U.S. Cl.
CPC ............... *G06F 21/6218* (2013.01)

(58) Field of Classification Search
CPC .................................................. G06F 21/6218
See application file for complete search history.

(56) References Cited

U.S. PATENT DOCUMENTS

| | | | |
|---|---|---|---|
| 2020/0034740 A1* | 1/2020 | Yang | G06N 20/00 |
| 2020/0304293 A1* | 9/2020 | Gama | H04L 9/00 |
| 2021/0058229 A1* | 2/2021 | Jiang | G06F 21/6245 |
| 2022/0200969 A1* | 6/2022 | Davey | H04L 63/0428 |
| 2022/0255730 A1* | 8/2022 | Matsumoto | G06N 5/04 |

OTHER PUBLICATIONS

Qinbin Li, et al., "A Survey on Federated Learning Systems: Vision, Hypeand Reality for Data Privacy and Protection", published on Jul. 23, 2019, Internet, https://arxiv.org/abs/1907.09693; Cited in the specification.

* cited by examiner

*Primary Examiner* — Michael M Lee
(74) *Attorney, Agent, or Firm* — HEA Law PLLC

(57) ABSTRACT

Provided is a computing system including: a first device configured to securely manage first secret information; and a second device configured to securely manage second secret information, wherein first public product being a product of first computation information and first public information, third secret information securely managed by the first device, and fourth secret information securely managed by the second device are used to compute a secret product being a product of the first secret information and the second secret information with the first secret information and the second secret information being securely managed.

17 Claims, 9 Drawing Sheets

FIG.2

Definition
- Feature (n x m): $X$ $(x_1, x_2, x_3)$
- Label (n x 1): $y$
- Prediction: $\hat{y}_i = w_1 y_{1i} + w_2 y_{2i} + w_3 y_{3i} + w_0$
- Loss (L2): $L = \Sigma_i (y_i - \hat{y}_i)^2$ Derivation (SGD)

- $\frac{\partial L}{\partial w_k} = \frac{\partial L}{\partial \hat{y}} \frac{\partial \hat{y}}{\partial w_k} = 2 \Sigma_i (\hat{y}_i - y_i) \frac{\partial \hat{y}_i}{\partial w_k} = 2 \Sigma_i (\hat{y}_i - y_i) y_{ki}$ $= 2(\Sigma_i w_1 y_{1i} y_{1i} + \Sigma_i w_2 y_{2i} y_{1i} + \Sigma_i w_3 y_{3i} y_{1i} + \Sigma_i (w_0 - y_i) y_{1i})$

- $\frac{\partial L}{\partial w_0} = \frac{\partial L}{\partial \hat{y}} \frac{\partial \hat{y}}{\partial w_0} = 2 \Sigma_i (\hat{y}_i - y_i) \frac{\partial \hat{y}_i}{\partial w_0} = 2 \Sigma_i (\hat{y}_i - y_i)$ $= 2(\Sigma_i w_1 y_{1i} + \Sigma_i w_2 y_{2i} + \Sigma_i w_3 y_{3i} + \Sigma_i (w_0 - y_i))$

- $\frac{\partial L}{\partial v} = \frac{\partial L}{\partial \hat{y}} \frac{\partial \hat{y}}{\partial v} = 2 \Sigma_i (\hat{y}_i - y_i) \frac{\partial \hat{y}_i}{\partial y_{ki}} \frac{\partial y_{ki}}{\partial v} = 2 \Sigma_i (\hat{y}_i - y_i) w_k \frac{\partial y_{ki}}{\partial v}$ $= 2 \left( \Sigma_i w_1 y_{1i} w_1 \frac{\partial y_{1i}}{\partial v} + \Sigma_i w_2 y_{2i} w_1 \frac{\partial y_{1i}}{\partial v} + \Sigma_i w_3 y_{3i} w_1 \frac{\partial y_{1i}}{\partial v} - \Sigma_i (w_0 - y_i) w_1 \frac{\partial y_{1i}}{\partial v} \right)$

C1

|  | A | B |
|---|---|---|
| Input | $a = (a_1, \cdots, a_n)$ | $b = (b_1, \cdots, b_n)$ |
| Output |  | $a \cdot b = \sum_{i=1}^{n} a_i b_i$ |
| E.g., | $a_i = w_2 y_{2i}$ | $b_i = w_1 \frac{\partial y_{1i}}{\partial v}$ |

Right Protocol        C2

|        | A | B |
|--------|---|---|
| Input  | $a$ | $b$ |
| Output |   | $a \cdot b$ |

Notation: $a \cdot b = a^T b = \langle a, b \rangle = \sum_i a_i b_i$

Left Protocol        C3

|        | A | B |
|--------|---|---|
| Input  | $a$ | $b$ |
| Output | $a \cdot b$ |   |

$v_k$ (scalar)

CALCULATION SYSTEM, CALCULATION METHOD, AND INFORMATION STORAGE MEDIUM

BACKGROUND OF THE INVENTION

1. Field of the Invention

The present disclosure relates to a computing system, a computing method, and an information storage medium.

2. Description of the Related Art

Hitherto, technologies for preventing leakage of information securely managed by a device have been investigated. For example, in Qinbin Li, Zeyi Wen, Zhaomin Wu, Sixu Hu, Naibo Wang, Yuan Li, Xu Liu, Bingsheng He, "A Survey on Federated Learning Systems: Vision, Hype and Reality for Data Privacy and Protection," Internet, retrieved on Mar. 16, 2023, arxiv.org/abs/1907.09693, there is described a method of federated learning for creating a learning model using a machine learning method without aggregating training data at one base location. It has been known that, in the federated learning, a plurality of devices each can execute training of a learning model without transmitting information securely managed by itself to another device.

SUMMARY OF THE INVENTION

For example, in such federated learning as described in Qinbin Li, Zeyi Wen, Zhaomin Wu, Sixu Hu, Naibo Wang, Yuan Li, Xu Liu, Bingsheng He, "A Survey on Federated Learning Systems: Vision, Hype and Reality for Data Privacy and Protection," Internet, retrieved on Mar. 16, 2023 arxiv.org/abs/1907.09693, there are demands to compute a secret product being a product of first secret information securely managed by a first device and second secret information securely managed by a second device in order to train the learning model. In fields other than the federated learning, there are similar demands in a case of computing a secret product being a product of a plurality of pieces of securely managed information. However, in this case, when the first device transmits the first secret information to the second device in a case in which the second device computes the secret product of the first secret information and the second secret information, the first secret information is transmitted over a network, and hence security is insufficient. Even when the first secret information is encrypted, there is a fear in that the first secret information may be decrypted by a third party. The same applies to a case in which the first device computes the secret product.

One object of the present disclosure is to enhance security.

According to at least one embodiment of the present disclosure, there is provided a computing system including: a first device configured to securely manage first secret information; and a second device configured to securely manage second secret information, wherein the first device is configured to: acquire first public information to be disclosed to the second device and third secret information securely managed by the first device so that a product of the first public information and the third secret information becomes the first secret information; and transmit the first public information to the second device; wherein the second device is configured to: receive the first public information from the first device; acquire first computation information by which a product of the first public information is to be computed and fourth secret information securely managed by the second device so that a product of the first computation information and the fourth secret information becomes the second secret information; compute a first public product being the product of the first computation information and the first public information; and transmit the first public product to the first device, wherein the first device is configured to receive the first public product from the second device, and wherein the first public product, the third secret information, and the fourth secret information are used to compute a secret product being a product of the first secret information and the second secret information with the first secret information and the second secret information being securely managed.

BRIEF DESCRIPTION OF THE DRAWINGS

FIG. 2 is a diagram for showing an example of formulae in federated learning.

FIG. 7 is a diagram for illustrating an example of a computing method for first public information and third secret information.

DETAILED DESCRIPTION OF THE INVENTION

1. Outline of Computing System According to First Embodiment

A first embodiment of the present disclosure is described as an example of embodiments of a computing system according to the present disclosure. In the first embodiment, a case in which the computing system is used for federated learning in machine learning is taken as an example. The federated learning is a method of learning that is executed by a plurality of devices in a distributed manner. Any one of the plurality of devices aggregates learning results from other devices and creates a learning model.

In related-art learning, a device that executes training of a learning model is required to collect training data from other devices. Thus, there is a fear in that the training data may leak to a third party, thereby causing a concern from a security point of view. In this respect, in the federated learning, each individual device only transmits the learning results without transmitting the training data to another device in principle, and hence the federated learning is useful from the security point of view. For example, when the training data includes personal information, the federated learning can prevent leakage of the personal information.

Figure 1:
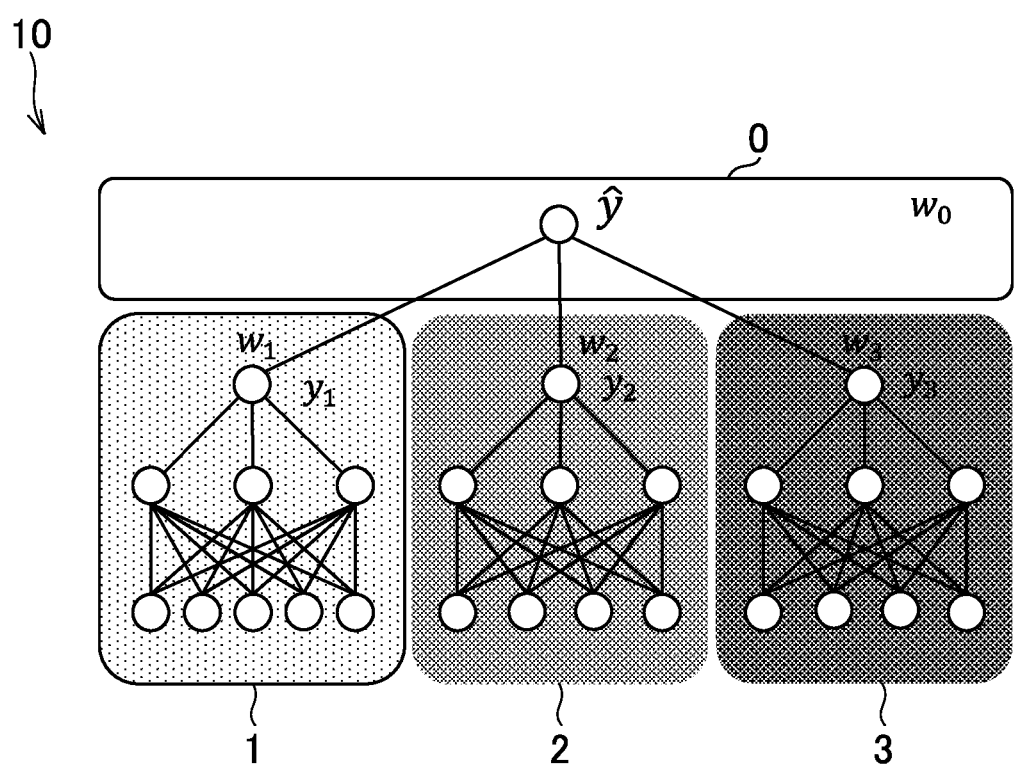
FIG. 1 is a diagram for illustrating an example of federated learning executed by a computing system.

FIG. 1 is a diagram for illustrating an example of federated learning executed in the computing system. In the example of FIG. 1, a case in which four services 0 to 3 cooperate with one another to execute federated learning is illustrated. For example, the service 0 is an information management service provided by a management company that manages various kinds of information relating to users. The service 1 is a financial service provided by a bank. The service 2 is a financial service provided by a securities company. The service 3 is an insurance service provided by an insurance company.

For example, computers for the respective services 0 to 3 cooperate with one another to execute federated learning. In FIG. 1, the computers are omitted. For the sake of simplification of FIG. 1, the following description is given on the assumption that execution subjects that execute the processing in the federated learning are the services 0 to 3, but in an actual case, the execution subjects are the computers for the respective services 0 to 3. Unless distinguished from one another, the services 0 to 3 are hereinafter referred to as "services" with the reference numerals omitted.

For example, in the federated learning, each service initializes its own learning model. Each service executes the training of its own learning model based on training data managed by itself. In principle, the training data is not disclosed to third parties. The training data is securely managed by each service. In the first embodiment, a case in which a learning model for estimating an annual income of a user is created in federated learning is taken as an example, but a learning model may be created for any other purpose. For example, a learning model for estimating an attribute other than the annual income, a learning model for use in image processing, a learning model for use in natural language processing, or another learning model may be created in federated learning.

For example, the training data includes demographic information that is considered to be correlated with the annual income, payment history in the service, browsing history of web pages, or other information. Each service manages the training data on its own, and does not transmit the training data to the outside in principle. In the first embodiment, a case in which features of each user who uses all the services 1 to 3 are indicated in the training data is taken as an example, but it suffices that features of each user who uses at least one of the services 1 to 3 are indicated in the training data.

FIG. 2 is a diagram for showing an example of formulae in the federated learning. For example, the service 1 executes the training of a learning model M1 for estimating the annual income of the user based on training data indicating a feature $x_1$ of each user securely managed by the bank. The service 2 executes the training of a learning model M2 for estimating the annual income of the user based on training data indicating a feature $x_2$ of each user securely managed by the securities company. The service 3 executes the training of a learning model M3 for estimating the annual income of the user based on training data indicating a feature $x_3$ of each user securely managed by the insurance company.

In the example of FIG. 2, a concept that includes the features $x_1$, $x_2$, and $x_3$ is represented as "feature X." The feature X is in a format of a matrix of n×m, where "n" and "m" each represent any natural number. For example, the service 0 manages a label "y" that is the annual income serving as a ground truth. In the example of FIG. 2, "y" represents a matrix of n×1 (so-called column vector). The service 0 collects local learning results obtained by the respective services 1 to 3, and executes the training of a learning model M0 for estimating the annual income of the user.

In the example of FIG. 2, the service 0 creates a learning model M0 for estimating the annual income "y" of the user based on an estimation result $y_1$ obtained by the learning model M1, an estimation result $y_2$ obtained by the learning model M2, and an estimation result $y_3$ obtained by the learning model M3. That is, the estimation results $y_1$ to $y_3$ are input to the learning model M0. The learning model M0 computes a feature amount based on the estimation results $y_1$ to $y_3$, and outputs the annual income "y" of the user as an estimation result corresponding to the feature amount. The learning model M0 can be said to be a model in stacking learning that is a type of ensemble learning using the estimation results $y_1$ to $y_3$ obtained by the learning models M1 to M3.

For example, the learning model M0 includes weighting factors $w_0$ to $w_4$ as parameters to be adjusted in learning. The learning model M0 may include another parameter (for example, bias) different from the weighting factors $w_0$ to $w_4$. In FIG. 2, "i" represents a numerical value indicating each individual user. As shown in FIG. 2, a loss L is computed based on a difference between a label $y_i$ serving as the ground truth and an estimation result $y_i$ (above which a symbol is added in FIG. 2) obtained by the learning model M0. The service 0 executes the training of the learning model M0 so that the loss L becomes smaller.

For example, the service 0 transmits the learning result obtained by the learning model M0 to each of the services 1 to 3. The service 1 updates the learning model M1 based on the learning result obtained by the learning model M0. The service 2 updates the learning model M2 based on the learning result obtained by the learning model M0. The service 3 updates the learning model M3 based on the learning result obtained by the learning model M0. Each of the services 1 to 3 transmits a new learning result to the service 0. In the same manner from then on, the service 0 and each of the services 1 to 3 repeatedly share the learning results with one another, and the learning models M0 to M3 are thus expected to be improved.

In the first embodiment, it is assumed that, although lines are omitted for the sake of simplification in FIG. 1, the services 1 to 3 share the learning results with one another. For example, the service 1 acquires the learning results obtained by the learning models M2 and M3 from the services 2 and 3, and updates the learning model M1. The service 2 acquires the learning results obtained by the learning models M1 and M3 from the services 1 and 3, and updates the learning model M2. The service 3 acquires the learning results obtained by the learning models M1 and M2 from the services 1 and 2, and updates the learning model M3.

The learning models M0 to M3 are hereinafter referred to simply as "learning models M" unless distinguished from one another. A learning method itself of the learning model M may be a publicly known method, and it is possible to use, for example, a gradient descent method or an error back-propagation method. In the first embodiment, a case in which the types and learning methods of the learning models M are the same is taken as an example, but at least one of the types or learning methods of the learning models M may differ from one another. For example, the learning model M0 may be a neural network, the learning model M1 may be a support vector machine, the learning model M2 may be a gradient-boosted regression tree, and the learning model M3 may be a linear regression model. Any one of methods corresponding to those types may be used as the learning method.

In the first embodiment, a case in which the learning model M is a neural network and the learning method of the learning model M is the gradient descent method is taken as an example. In the gradient descent method, parameters of the learning model M are iteratively updated, and a gradient (inclination) of the loss is computed to update the parameters in a direction in which the gradient most greatly descends. For example, when the gradient descent method is used in the training of the learning model M0, such differential formulae as shown in FIG. 2 are used. Similar formulae are used when the gradient descent method is used in the training of the learning models M1 to M3. The gradient descent method itself is a publicly known technology, and hence details of the formulae of FIG. 2 are omitted.

For example, the underlined parts in one of the formulae of FIG. 2 is an inner product of the column vector relating to the service 1 and the column vector relating to the service 2. When the services 1 and 2 execute the training of the learning models M1 and M2, respectively, it is required to acquire similar information. In this case, the services 1 and 2 are required to acquire the inner product underlined in the formula of FIG. 2 without transmission of information required to be securely managed. Table C1 of FIG. 2 is obtained by generalizing a problem for satisfying such a requirement. When the problem of Table C1 can be solved, the computing system can acquire the inner product without causing the services to transmit the securely managed information to each other.

Figure 3:
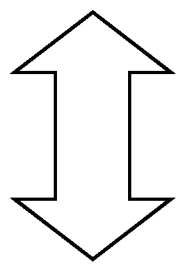
FIG. 3 includes tables for showing specific examples of a problem of the table of FIG. 2.

FIG. 3 includes tables for showing specific examples of the problem of Table C1 of FIG. 2. For example, a first device A for a certain service securely manages an m-dimensional vector "a". A second device B for another service securely manages an m-dimensional vector "b". For example, an element included in an m-dimensional vector indicates some feature relating to each individual user. The second device B requires high security. From a security point of view, there is a constraint that the first device A and the second device B each transmit some integrated information in place of the vector "a" and the vector "b".

For example, as shown in Table C2, when the second device B can acquire an inner product a·b of the vector "a" and the vector "b" without acquiring the vector "a" from the first device A, the inner product a·b acquired in this manner is useful for the training of the learning model M managed by the second device B. In the first embodiment, an example of this method is described. In contrast, as shown in Table C3, when the first device A can acquire the inner product a·b of the vector "a" and the vector "b" without acquiring the vector "b" from the second device B, the inner product a·b acquired in this manner is useful for the training of the learning model M managed by the first device A. In a second embodiment of the present disclosure described later, an example of this method is described.

2. Hardware Configuration of Computing System According to First Embodiment

Figure 4:
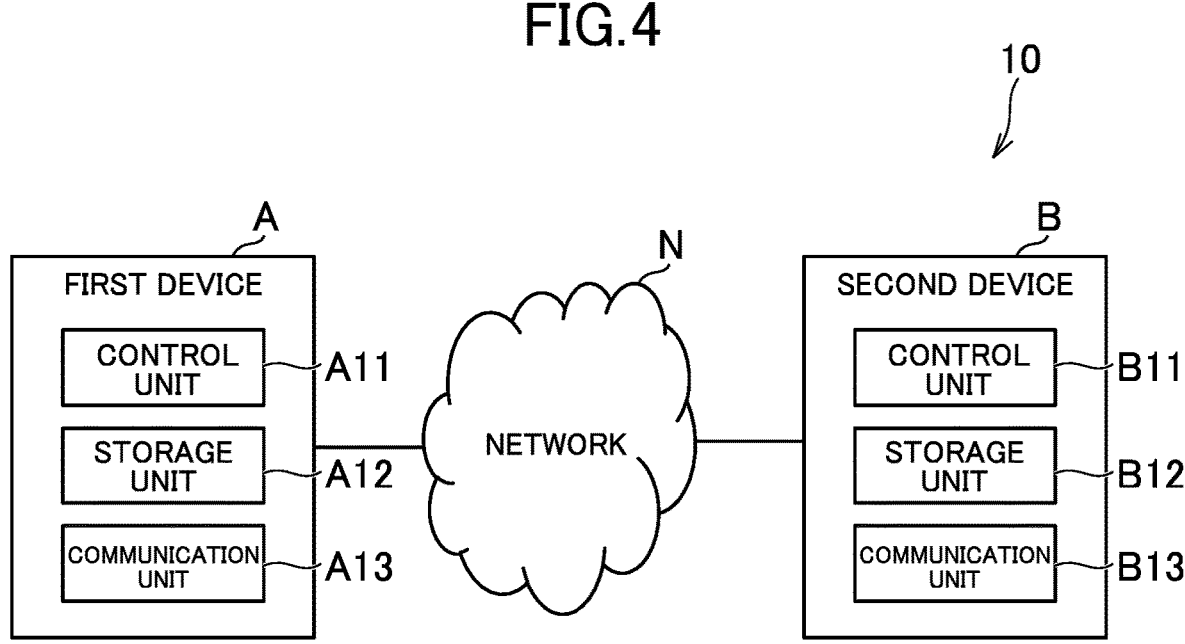
FIG. 4 is a diagram for illustrating an example of a hardware configuration of a computing system according to a first embodiment of the present disclosure.

FIG. 4 is a diagram for illustrating an example of a hardware configuration of the computing system according to the first embodiment. For example, a computing system 10 includes the first device A that securely manages first secret information "y" described later and the second device B that securely manages second secret information "x"

described later. The first device A and the second device B are connected to each other through a network N such as the Internet or a LAN.

The first device A is a computer for a first service. In the first embodiment, a case in which the first service is the service 1 (service provided by the bank) of FIG. 1 is taken as an example, but the first service may be any other service. For example, the first service may be one of the services 0, 2, and 3 of FIG. 1, and may be another service that is not illustrated in FIG. 1. The other service may be a communication service, an electronic commerce service, a travel booking service, an electronic payment service, or a reward point management service.

For example, the first device A is a server computer, a personal computer, a tablet computer, or a smartphone. The first device A includes a control unit A11, a storage unit A12, and a communication unit A13. The control unit A11 includes at least one processor. The storage unit A12 includes a volatile memory such as a RAM and a nonvolatile memory such as a flash memory. The communication unit A13 includes at least one of a communication interface for wired communication or a communication interface for wireless communication.

The second device B is a computer for a second service. For example, the second device B is a server computer, a personal computer, a tablet computer, or a smartphone. The second device B includes a control unit B11, a storage unit B12, and a communication unit B13. Hardware configurations of the control unit B11, the storage unit B12, and the communication unit B13 are the same as the control unit A11, the storage unit A12, and the communication unit A13, respectively.

In the first embodiment, a case in which the second service is the service 2 (service provided by the securities company) of FIG. 1 is taken as an example, but the second service may be any other service. For example, the second service may be the same as the first service. When the second service is different from the first service, the second service may be a service other than the first service among the services exemplified in the description of the first service. The first device A and the second device B may be devices that are used privately or for other purposes irrespective of any specific service.

In the first embodiment, a case in which the second device B requires higher security than the first device A is taken as an example. For example, imposing limitations on data that can be transmitted to the network N corresponds to the high security. When the second device B transmits the same type of data as that of the first device A to the outside, the second device B is required to process the data to a larger extent than the first device A. For example, the first device A is allowed to transmit the data having a matrix format to the network N without changing the number of rows, but the second device B is required to change the number of rows of data having a matrix format to transmit the data to the network N.

Unless distinguished from each other, the first device A and the second device B are hereinafter referred to simply as "devices" with the reference symbols omitted. Unless distinguished from each other, the control units A11 and B11, the storage units A12 and B12, and the communication units A13 and B13 are hereinafter referred to as "control units 11," "storage units 12," and "communication units 13," respectively, with the affixed alphabetical characters omitted. A program stored in the storage unit 12 may be supplied to the device through the network N. Further, a program stored in a computer-readable information storage medium may be supplied to the device through a reading unit (for example, optical disc drive or memory card slot) that reads the information storage medium or an input/output unit (for example, USB port) for inputting and outputting data to/from an external device.

In addition, in the computing system 10, the plurality of devices including the first device A, the second device B, and the other device may be able to communicate to/from one another. That is, the computing system 10 may include another device different from the first device A and the second device B. For example, the other device is a server computer, a personal computer, a tablet computer, or a smartphone. The computing system 10 may include a plurality of other devices. When there are four services as in FIG. 1, the computing system 10 includes the first device A, the second device B, and at least two other devices.

For example, when the computing system 10 includes the other device, the second device B requires relatively high security among the plurality of devices. The other device may have the same function as that of the first device A or the second device B. When the other device has the same function as that of the first device A, the computing system 10 including the first device A and the other device means the computing system 10 including a plurality of first devices A. When the other device has the same function as that of the second device B, the computing system 10 including the second device B and the other device means the computing system 10 including a plurality of second devices B.

3. Functions Implemented by Computing System According to First Embodiment

Figure 5:
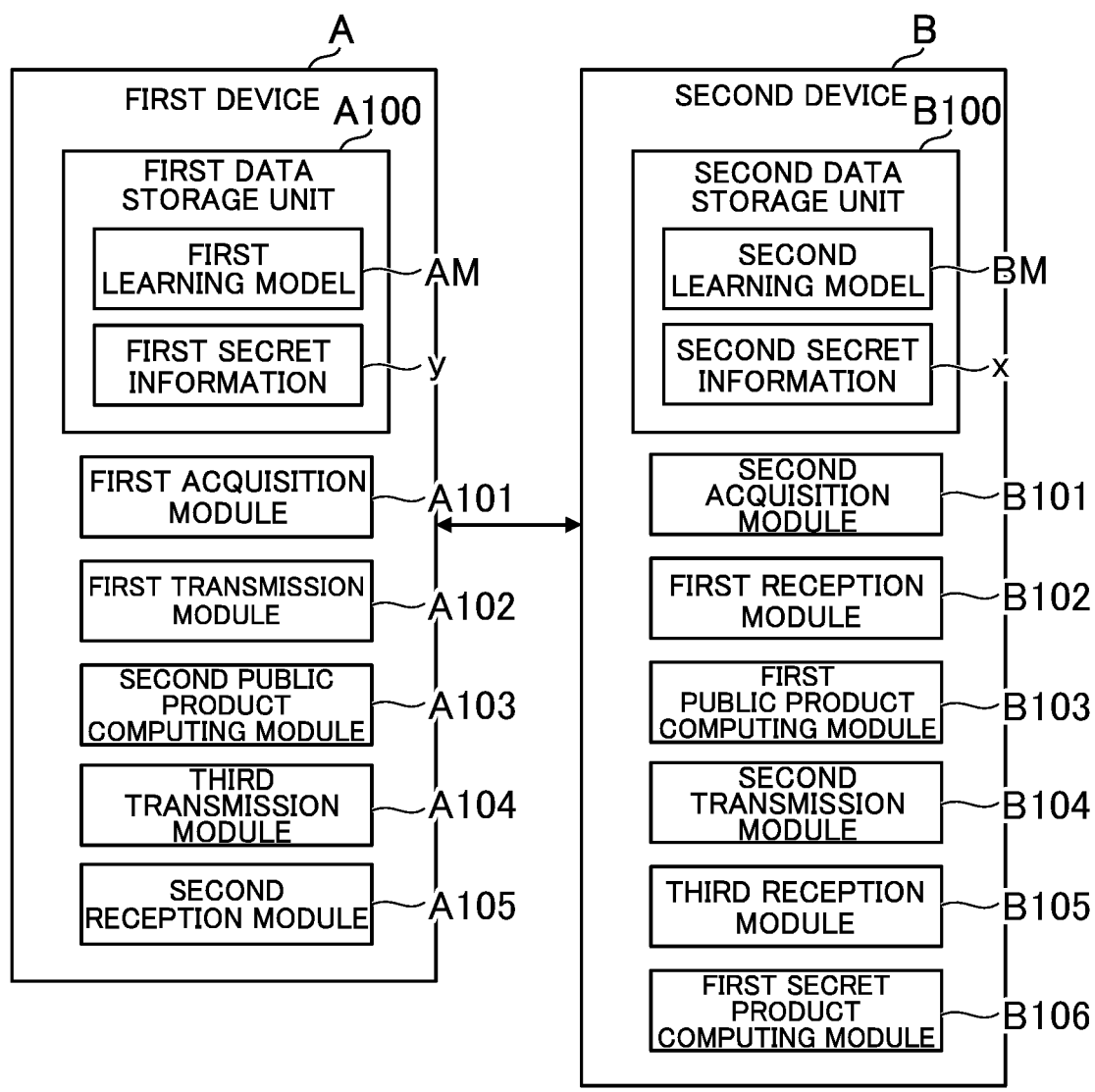
FIG. 5 is a diagram for illustrating an example of functions implemented by the computing system according to the first embodiment.

FIG. 5 is a diagram for illustrating an example of functions implemented by the computing system 10 according to the first embodiment. For example, the first device A includes a first data storage unit A100, a first acquisition module A101, a first transmission module A102, a second public product computing module A103, a third transmission module A104, and a second reception module A105. The first data storage unit A100 is implemented by the storage unit A12. The first acquisition module A101, the first transmission module A102, the second public product computing module A103, and the third transmission module A104 are implemented by the control unit A11.

For example, the second device B includes a second data storage unit B100, a second acquisition module B101, a first reception module B102, a first public product computing module B103, a second transmission module B104, a third reception module B105, and a first secret product computing module B106. The second data storage unit B100 is implemented by the storage unit B12. The second acquisition module B101, the first reception module B102, the first public product computing module B103, the second transmission module B104, the third reception module B105, and the first secret product computing module B106 are implemented by the control unit B11.

[First Data Storage Unit]

The first data storage unit A100 stores data required for processing to be executed by the first device A. For example, the first data storage unit A100 stores a first learning model AM and the first secret information "y". The first learning model AM is the learning model M managed by the first device A. The first device A uses the method of the federated learning to execute the training of the first learning model AM.

For example, the first data storage unit A100 stores the first secret information "y". The first secret information "y" is information securely managed by the first device A. The first secret information "y" is not transmitted to any device other than the first device A in principle. The first secret information "y" is information indicating one numerical value or information including a plurality of numerical values. In the first embodiment, a case in which the first secret information "y" has a vector format is taken as an example, but the first secret information "y" may be any information based on which a product can be computed, for example, may be one numerical value, a plurality of numerical values, a matrix, an array, a data frame, or other information.

In the first embodiment, the first device A computes the first secret information "y" in course of the training of the first learning model AM in the federated learning. For example, the first device A may acquire a part of the parameters of the first learning model AM as the first secret information "y", or may acquire information computed from the part as the first secret information "y". For example, the first secret information "y" is a value obtained by multiplying the part of the parameters of the first learning model AM under the present circumstances by an estimation result obtained by the first learning model AM under the present circumstances.

The first secret information "y" may be information relating to each of a plurality of users in the first service. For example, the first secret information "y" may include a value obtained by multiplying the part of the parameters of the first learning model AM under the present circumstances by an estimation result of the annual income of each of the plurality of users obtained by the first learning model AM under the present circumstances. In this case, the number of dimensions of the first secret information "y" is the number of users. The first secret information "y" may also be, for example, information in which personal information, such as an age group or a gender of the user, is digitized (quantified). The first secret information "y" may be information obtained by digitizing each of a plurality of pieces of personal information of the user.

In addition, user identification information on each of the plurality of users the in first service and user identification information on each of the plurality of users in the second service may be the same. The user identification information is information that can identify the user. For example, a login account, an email address, or a telephone number correspond to the user identification information. In the first embodiment, a case in which the user identification information is common in the first service and the second service is taken as an example, but the user identification information may be different between the first service and the second service. In this case, it is assumed that, for each user, there is data that defines a correspondence relationship between the user identification information in the first service and the user identification information in the second service. It is assumed that the data is stored in the first data storage unit A100, the second data storage unit B100, or another place.

The data stored in the first data storage unit A100 is not limited to the above-mentioned example. The first data storage unit A100 can store any data. For example, the first data storage unit A100 stores the training data for the first learning model AM. The training data includes an input part to be input to the first learning model AM and an output part corresponding to the input part. The output part corresponds to a ground truth at a time of training. The first device A executes local training of the first learning model AM based on the training data stored in the first data storage unit A100. When the input part of the training data is input, the first device A adjusts the parameters of the first learning model AM so that the output part of the training data is output.

In this embodiment, the first learning model AM for estimating the annual income of the user is created, and hence the input part of the training data is some information relating to the user. For example, a feature such as the demographic information on the user in the first service corresponds to the input part of the training data. The output part of the training data is the annual income of the user. The annual income corresponding to the output part of the training data may be an annual income registered in the first service by the user, or may be an annual income registered in another service by the user. The annual income corresponding to the output part of the training data may be an annual income designated by a creator of the first learning model AM. The first device A may use the method of the federated learning to update the locally trained first learning model AM. This processing is described in the second embodiment. For example, the first data storage unit A100 may store not only the data described above but also various kinds of information described in the second embodiment.

[Second Data Storage Unit]

The second data storage unit B100 stores data required for the processing to be executed by the second device B. For example, the second data storage unit B100 stores a second learning model BM and the second secret information "x". The second learning model BM is the learning model M managed by the second device B. The second device B uses the method of the federated learning to execute the training of the second learning model BM.

For example, the second data storage unit B100 stores the second secret information "x". The second secret information "x" is information securely managed by the second device B. The second secret information "x" is not transmitted to any device other than the second device B in principle. The second secret information "x" is information indicating one numerical value or information including a plurality of numerical values. In the first embodiment, a case in which the second secret information "x" has a vector format is taken as an example, but the second secret information "x" may be any information based on which a product can be computed, for example, may be one numerical value, a plurality of numerical values, a matrix, an array, a data frame, or other information.

In the first embodiment, the second device B computes the second secret information "x" in course of the training of the second learning model BM in the federated learning. For example, the second device B may acquire a part of the parameters of the second learning model BM as the second secret information "x", or may acquire information computed from the part as the second secret information "x". For example, the second secret information "x" is a value obtained by multiplying the part of the parameters of the second learning model BM under the present circumstances by an estimation result obtained by the second learning model BM under the present circumstances.

The second secret information "x" may be information relating to each of a plurality of users in the second service. For example, the second secret information "x" may include a value obtained by multiplying the part of the parameters of the second learning model BM under the present circumstances by an estimation result of the annual income of each of the plurality of users obtained by the second learning model BM under the present circumstances. In this case, the number of dimensions of the second secret information "x" is the number of users. The second secret information "x" may also be, for example, information in which personal information, such as an age group or a gender of the user, is digitized (quantified). The second secret information "x" may be information obtained by digitizing each of a plurality of pieces of personal information of the user.

The data stored in the second data storage unit B100 is not limited to the above-mentioned example. The second data storage unit B100 can store any data. For example, the second data storage unit B100 stores the training data for the second learning model BM. The training data includes an input part to be input to the second learning model BM and the output part corresponding to the input part. The output part corresponds to a ground truth at the time of training. The second device B executes local training of the second learning model BM based on the training data stored in the second data storage unit B100. When the input part of the training data is input, the second device B adjusts the parameters of the second learning model BM so that the output part of the training data is output.

In the first embodiment, the second learning model BM for estimating the annual income of the user is created, and hence the input part of the training data is some information relating to the user. For example, a feature such as the demographic information on the user in the second service corresponds to the input part of the training data. The output part of the training data is the annual income of the user. The annual income corresponding to the output part of the training data may be an annual income registered in the second service by the user, or may be an annual income registered in another service by the user. The annual income corresponding to the output part of the training data may be an annual income designated by a creator of the second learning model BM. The second device B may use the method of the federated learning to update the locally trained second learning model BM. This processing is described in the second embodiment. For example, the second data storage unit B100 may store not only the data described above but also various kinds of information described in the second embodiment.

Figure 6:
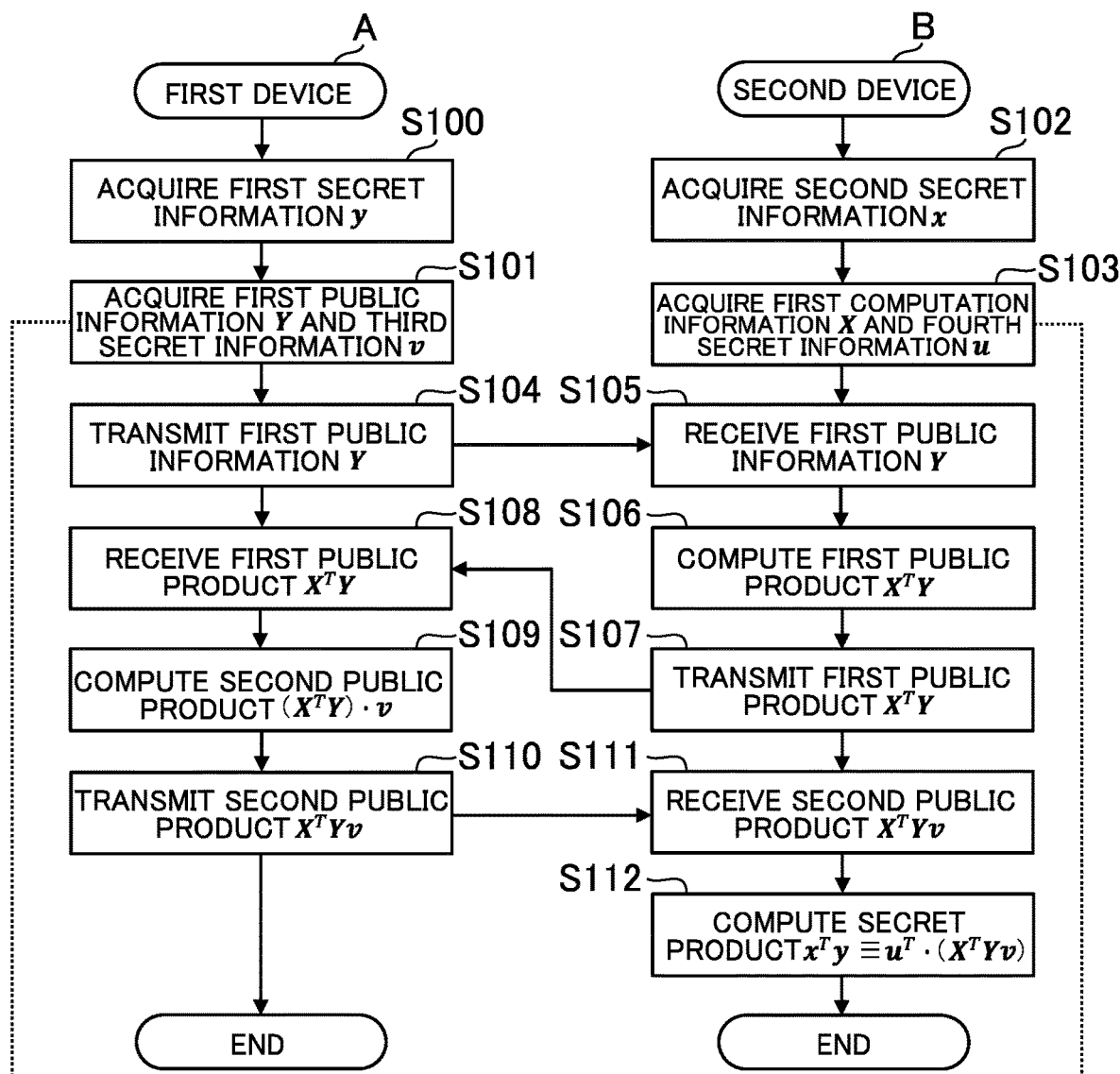
FIG. 6 is a diagram for illustrating an example of processing executed by the computing system according to the first embodiment.

FIG. 6 is a diagram for illustrating an example of processing executed by the computing system 10 according to the first embodiment. The processing of FIG. 6 is executed by the first device A executing the program stored in the first data storage unit A100 and the second device B executing the program stored in the second data storage unit B100. Referring to FIG. 6, the first acquisition module A101, the first transmission module A102, the second public product computing module A103, and the third transmission module A104 of the first device A and the second acquisition module B101, the first reception module B102, the first public product computing module B103, the second transmission module B104, the third reception module B105, and the first secret product computing module B106 of the second device B are described in detail below.

[First Acquisition Module]

The first acquisition module A101 acquires the first secret information "y" stored in the first data storage unit A100 (Step S100). The first secret information "y" is read out by the processing step of Step S100 to be loaded into a memory area of the nonvolatile memory. When the first secret information "y" has been loaded in the memory area in advance, the processing step of Step S100 is not required to be executed. The first acquisition module A101 acquires first public information Y to be disclosed to the second device B and third secret information "v" securely managed by the first device A so that a product of the first public information Y and the third secret information "v" becomes the first secret information "y" (Step S101).

In the first embodiment, a case in which the first acquisition module A101 acquires the first public information Y and the third secret information "v" by computing the first public information Y and the third secret information "v" by itself is taken as an example. Thus, acquiring the first public information Y and the third secret information "v" has the same meaning as that of computing the first public information Y and the third secret information "v". The first acquisition module A101 may also acquire the first public information Y and the third secret information "v" that have been externally computed, instead of computing the first public information Y and the third secret information "v" by itself. In this case, the first device A has a function of computing the first public information Y and the third secret information "v" separately from the first acquisition module A101. A computing method performed by this function may be the same as a method described below.

Figure 7:
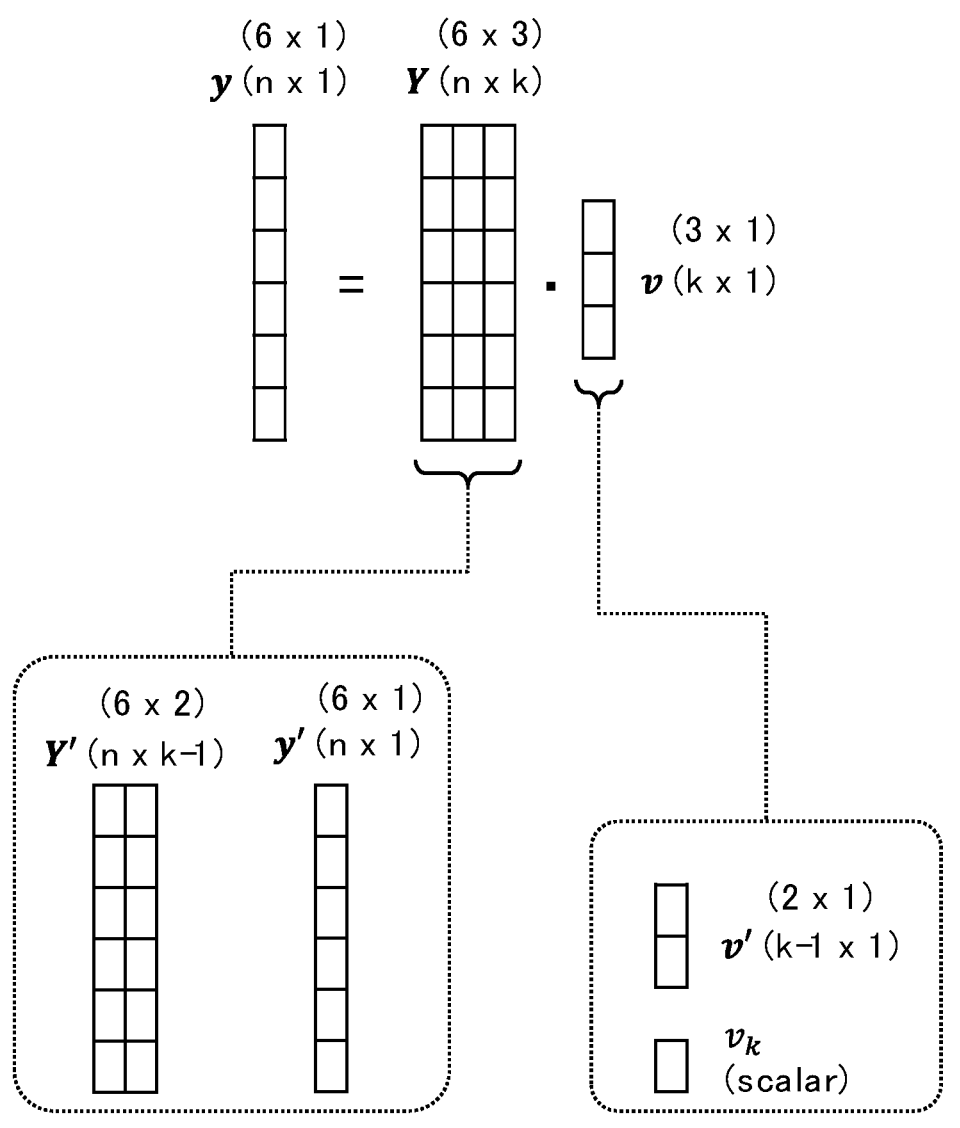

FIG. 7 is a diagram for illustrating an example of a computing method for the first public information Y and the third secret information "v". In the first embodiment, a case in which the first public information Y and the third secret information "v" each have a matrix format is taken as an example, but each of the first public information Y and the third secret information "v" may be any information based on which the product can be computed, and is not limited to the matrix format. For example, the first public information Y and the third secret information "v" each may be one numerical value, a plurality of numerical values, a matrix, an array, a data frame, or other information. In the same manner, in the first embodiment, a case in which a first part Y' and a second part y' described later each have a matrix format is taken as an example, but the first part Y' and the second part y' each may have another format.

For example, the first acquisition module A101 acquires the first public information Y and the third secret information "v" based on at least one random number. In the first embodiment, a case in which the random number for acquiring the first public information Y and the random number for acquiring the third secret information "v" are different from each other is taken as an example, but those random numbers may be the same. That is, the first acquisition module A101 may acquire each of the first public information Y and the third secret information "v" based on the same random number. As an algorithm for generating the random number, it is possible to use a publicly known algorithm. For example, the first acquisition module A101 may generate the random number based on a linear congruential method, a multiplicative congruential method, an M-sequence method, or the Mersenne twister method. The first acquisition module A101 may also acquire the random number generated and stored in the first data storage unit A100 in advance, instead of generating the random number by itself.

For example, the first acquisition module A101 acquires the first part Y' being a part of the first public information Y based on a first random number. In the example of FIG. 7, the first secret information "y" is a matrix (column vector) of n×1 (where "n" represents a natural number). The first public information Y is a matrix of n×k (where "k" represents a natural number). The first part Y' is a matrix of n×(k−1). That is, the first part Y' is smaller than the first public information Y by one column. For example, the first part Y' is a part from the first column to the (k−1)th column of the first public information Y. The first acquisition module A101 generates mutually different n×(k−1) first random numbers based on a random number generation algorithm, and acquires the first random numbers as individual elements (components) that form the first part Y'. The n×(k−1) numerical values may coincidentally include the same first random numbers.

For example, the first acquisition module A101 acquires the third secret information "v" (in the example of FIG. 7, v' and $v_k$) based on a second random number. In the example of FIG. 7, the third secret information "v" is a matrix (column vector) of k×1. The first acquisition module A101 generates mutually different "k" second random numbers based on the random number generation algorithm, and acquires the second random numbers as individual elements (components) that form the third secret information "v". The "k" numerical value may coincidentally include the same second random numbers. The first acquisition module A101 acquires the second part y' being a remaining part of the first public information Y based on the first part Y' and the third secret information "v".

For example, the first acquisition module A101 acquires the second part y' so that the product of the first public information Y, which is obtained by connecting the second part y' to the first part Y', and the third secret information "v" becomes the first secret information "y". In the example of FIG. 7, the first acquisition module A101 acquires the second part y' so that a product of the first part Y' and a part v' (for example, matrix of (k−1)×1) of the third secret information "v" and a product of a remaining part $v_k$ (for example, scalar value) of the third secret information "v" and the second part y' become the first secret information "y". This computation may be executed through use of an inverse matrix. In this manner, the first acquisition module A101 generates the first part Y' formed of free random numbers and generates the above-mentioned part v' and the above-mentioned remaining part $v_k$ that are formed of free random numbers, to thereby acquire the second part y' illustrated in FIG. 7.

The first acquisition module A101 may acquire the first public information Y without being based on the first random number. For example, the first acquisition module A101 may acquire the first public information Y so that the product of the third secret information "v" generated based on the second random number and the first public information Y becomes the first secret information "y". In this case, the first random number is not used. This case means that the first acquisition module A101 acquires the first public information Y without acquiring a plurality of parts, such as the first part Y' and the second part y'. In contrast, the first acquisition module A101 may acquire the third secret information "v" without being based on the second random number. For example, the first acquisition module A101 may acquire the third secret information "v" so that the product of the first public information Y generated based on the first random number and the third secret information "v" becomes the first secret information "y". In this case, the second random number is not used. This case means that the first acquisition module A101 acquires the first public information Y without acquiring a plurality of parts, such as the part v' and the remaining part $v_k$.

For example, the first acquisition module A101 may acquire the first public information Y and the third secret information "v" without being based on the random numbers. For example, the first acquisition module A101 may acquire the first public information Y so that the product of the third secret information "v" generated without being based on the random number and the first public information Y becomes the first secret information "y". In this case, the third secret information "v" may be information designated by an administrator of the computing system 10 or another person, or may be information generated through use of an algorithm other than the random number. Meanwhile, the first public information Y may be information that is not based on the random number, but because the first public information Y is transmitted over the network N, it is assumed that, in the first embodiment, the first public information Y is information obtained by directly or indirectly using the random number.

[Second Acquisition Module]

The second acquisition module B101 acquires the second secret information "x" stored in the second data storage unit B100 (Step S102). The second secret information "x" is read out by the processing step of Step S102 to be loaded into a memory area of the nonvolatile memory. When the second secret information "x" has been loaded in the memory area in advance, the processing step of Step S102 is not required to be executed. The second acquisition module B101 acquires first computation information X by which a product of the first public information Y is to be computed and fourth secret information "u" securely managed by the second device B so that a product of the first computation information X and the fourth secret information "u" becomes the second secret information "x" (Step S103).

In the first embodiment, a case in which the second acquisition module B101 acquires the first computation information X and the fourth secret information "u" by computing the first computation information X and the fourth secret information "u" by itself is taken as an example. Thus, acquiring the first computation information X and the fourth secret information "u" has the same meaning as that of computing the first computation information X and the fourth secret information "u". The second acquisition module B101 may also acquire the first computation information X and the fourth secret information "u" that have been externally computed, instead of computing the first computation information X and the fourth secret information "u" by itself. In this case, the second device B has a function of computing the first computation information X and the fourth secret information "u" separately from the second acquisition module B101. A computing method performed by this function may be the same as a method described below.

In the first embodiment, a case in which a computing method for the first computation information X and the fourth secret information "u" is the same as the computing method for the first public information Y and the third secret information "v" is taken as an example, but those computing methods may differ from each other. In addition, in the first embodiment, a case in which the first computation information X and the fourth secret information "u" each have a matrix format is taken as an example, but each of the first computation information X and the fourth secret information "u" may be any information based on which the product can be computed, and is not limited to the matrix format. For example, the first computation information X and the fourth secret information "u" each may be one numerical value, a plurality of numerical values, a matrix, an array, a data frame, or other information. In the same manner, in the first embodiment, a case in which a third part X' and a fourth part x' described later each have a matrix format is taken as an example, but the third part X' and the fourth part x' each may have another format.

For example, the second acquisition module B101 acquires the first computation information X and the fourth secret information "u" based on at least one random number. In the first embodiment, a case in which the random number for acquiring the first computation information X and the random number for acquiring the fourth secret information "u" are different from each other is taken as an example, but those random numbers may be the same. That is, the second acquisition module B101 may acquire each of the first computation information X and the fourth secret information "u" based on the same random number. As an algorithm for generating the random number, it is possible to use a publicly known algorithm. For example, the second acquisition module B101 may generate the random number based on a linear congruential method, a multiplicative congruential method, an M-sequence method, or the Mersenne twister method. The second acquisition module B101 may also acquire the random number generated and stored in the second data storage unit B100 in advance, instead of generating the random number by itself.

For example, the second acquisition module B101 acquires the third part X' being a part of the first computation information X based on a third random number. The second secret information "x" is a matrix (column vector) of n×1. For example, the first computation information X is a matrix of n×j (where "j" represents a natural number smaller than "k"). The third part X' is a matrix of n×(j−1). That is, the third part X' is smaller than the first computation information X by one column. For example, the third part X' is a part from the first column to the (j−1)th column of the first computation information X. The second acquisition module B101 generates mutually different n×(j−1) third random numbers based on the random number generation algorithm, and acquires the third random numbers as individual elements (components) that form the third part X'. The n×(j−1) numerical values may coincidentally include the same third random numbers.

For example, the second acquisition module B101 acquires the fourth secret information "u" based on a fourth random number. The fourth secret information "u" is a matrix (column vector) of j×1. The second acquisition module B101 generates mutually different "j" fourth random numbers based on the random number generation algorithm, and acquires the fourth random numbers as individual elements (components) that form the fourth secret information "u". The "j" numerical values may coincidentally include the same fourth random numbers. The second acquisition module B101 acquires the fourth part x' being a remaining part of the first computation information X based on the third part X' and the fourth secret information "u".

For example, the second acquisition module B101 acquires the fourth part x' so that the product of the first computation information X, which is obtained by connecting the fourth part x' to the third part X', and the fourth secret information "u" becomes the second secret information "x". The second acquisition module B101 acquires the fourth part x' so that a product of the third part X' and a part u' (for example, matrix of (j−1)×1) of the fourth secret information "u" and a product of a remaining part $u_j$ (for example, scalar value) of the fourth secret information "u" and the fourth part x' become the second secret information "x". This computation may be executed through use of an inverse matrix.

The second acquisition module B101 may acquire the first computation information X without being based on the third random number. For example, the second acquisition module B101 may acquire the first computation information X so that the product of the fourth secret information "u" generated based on the fourth random number and the first computation information X becomes the second secret information "x". In this case, the third random number is not used. This case means that the second acquisition module B101 acquires the first computation information X without acquiring a plurality of parts, such as the third part X' and the fourth part x'. In contrast, the second acquisition module B101 may acquire the fourth secret information "u" without being based on the fourth random number. For example, the second acquisition module B101 may acquire the fourth secret information "u" so that the product of the first computation information X generated based on the third random number and the fourth secret information "u" becomes the second secret information "x". In this case, the fourth random number is not used. This case means that the second acquisition module B101 acquires the first computation information X without acquiring a plurality of parts, such as the part u' and the remaining part $u_j$.

For example, the second acquisition module B101 may acquire the first computation information X and the fourth secret information "u" without being based on the random number. For example, the second acquisition module B101 may acquire the first computation information X so that the product of the fourth secret information "u" generated without being based on the random number and the first computation information X becomes the second secret information "x". In this case, the fourth secret information "u" may be information designated by the administrator of the computing system 10 or another person, or may be information generated through use of an algorithm other than the random number. Meanwhile, the first computation information X may be information that is not based on the random number, but because the first computation information x is transmitted over the network N, it is assumed that, in the first embodiment, the first computation information X is information obtained by directly or indirectly using the random number.

[First Transmission Module]

The first transmission module A102 of the first device A transmits the first public information Y to the second device B (Step S104). In the first embodiment, a case in which the first transmission module A102 encrypts the first public information Y based on a predetermined encryption algorithm and then transmits the encrypted first public information Y to the second device B is taken as an example, but the first transmission module A102 may transmit the first public information Y in plaintext to the second device B without encrypting the first public information Y.

[First Reception Module]

The first reception module B102 of the second device B receives the first public information Y from the first device A (Step S105). In the first embodiment, the first public information Y is encrypted, and hence the first reception module B102 decrypts the first public information Y received from the first device A. When the first public information Y is transmitted in plaintext, the first reception module B102 does not perform the decryption.

[First Public Product Computing Module]

The first public product computing module B103 of the second device B computes a first public product $X^TY$ being a product of the first computation information X and the first public information Y (Step S106). In Step S106, the first public product computing module B103 may compute the product of the first computation information X and the first public information Y based on a publicly known computing method for computing a product of matrices. The first public product computing module B103 may be able to compute the first public product $X^TY$ so that the number of rows of the second secret information "x" and the number of rows of the first public product $X^TY$ differ from each other. When a product of a certain matrix and another matrix is to be computed, those matrices are assumed to have the numbers of rows and the numbers of columns that enable the product thereof to be computed. This point is also true for the computation of products in processing steps other than Step S106.

[Second Transmission Module]

The second transmission module B104 of the second device B transmits the first public product $X^TY$ to the first device A (Step S107). In the first embodiment, a case in which the second transmission module B104 encrypts the first public product $X^TY$ based on a predetermined encryption algorithm and then transmits the encrypted first public product $X^TY$ to the first device A is taken as an example, but the second transmission module B104 may transmit the first public product $X^TY$ in plaintext to the first device A without encrypting the first public product $X^TY$.

[Second Reception Module]

The second reception module A105 of the first device A receives the first public product $X^TY$ from the second device B (Step S108). In the first embodiment, the first public product $X^TY$ is encrypted, and hence the second reception module A105 decrypts the first public product $X^TY$ received from the second device B. When the first public information Y is transmitted in plaintext, the second reception module A105 does not perform the decryption.

[Second Public Product Computing Module]

The second public product computing module A103 computes a second public product $(X^TY) \cdot v$ being a product of the first public product $X^TY$ and the third secret information "v" (Step S109). In Step S109, the second public product computing module A103 may compute the product of the first public product $X^TY$ and the third secret information "v" based on a publicly known computing method for computing a product of matrices.

[Third Transmission Module]

The third transmission module A104 of the first device A transmits the second public product $X^TYv$ to the second device B (Step S110). The value $X^TYv$ has the same meaning as that of $(X^TY) \cdot v$, and represents a computation result of $(X^TY) \cdot v$. In the first embodiment, a case in which the third transmission module A104 encrypts the second public product $X^TYv$ based on a predetermined encryption algorithm and then transmits the encrypted second public product $X^TYv$ to the second device B is taken as an example, but the third transmission module A104 may transmit the second public product $X^TYv$ in plaintext to the second device B without encrypting the second public product $X^TYv$.

[Third Reception Module]

The third reception module B105 receives the second public product $X^TYv$ from the first device A (Step S111). In the first embodiment, the second public product $X^TYv$ is encrypted, and hence the third reception module B105 decrypts the second public product $X^TYv$ received from the first device A. When the second public product $X^TYv$ is transmitted in plaintext, the third reception module B105 does not perform the decryption.

[First Secret Product Computing Module]

In the computing system 10, a secret product $x^Ty$ being a product of the first secret information "y" and the second secret information "x" is computed based on the first public product $X^TY$, the third secret information "v", and the fourth secret information "u" with the first secret information "y" and the second secret information "x" being securely managed. In the first embodiment, a case in which the second device B has a function of computing the secret product $x^Ty$ is described.

The first secret product computing module B106 computes the secret product $x^T y = u^T \cdot (X^T Y v)$ based on the fourth secret information "u" and the second public product $X^T Y v$ (Step S112). In the first embodiment, a case in which the secret product $x^T y$ is an inner product of the first secret information "y" and the second secret information "x" is taken as an example, but the first secret product computing module B106 may compute a product of the first secret information "y" and the second secret information "x" in place of the inner product. In Step S112, the first secret product computing module B106 may compute the inner product of the fourth secret information "u" and the second public product $X^T Y v$ based on a publicly known computing method for computing an inner product of matrices. The right-hand side of the mathematical expression in Step S112 corresponds to a product of: the first public information Y and the third secret information "v" the product of which is the first secret information "y"; and the fourth secret information "u" and the first computation information X the product of which is the second secret information "x", and hence the second device B can compute the same value as the inner product of the first secret information "y" and the second secret information "x".

For example, in the computing system 10, the training of the learning model M in the federated learning is executed based on the secret product $x^T y$. For example, the learning model M may be a model in stacking learning for executing predetermined estimation based on an estimation result of each of a plurality of other learning models. In the first embodiment, the second device B executes the training of the second learning model BM based on the secret product $x^T y$. For example, the second device B executes the training of the second learning model BM based on the formulae shown in FIG. 2.

4. Summary of First Embodiment

The first device A in the first embodiment acquires the first public information Y to be disclosed to the second device B and the third secret information "v" securely managed by the first device A so that the product of the first public information Y and the third secret information "v" becomes the first secret information "y". The first device A transmits the first public information Y to the second device B. The second device B receives the first public information Y from the first device A. The second device B acquires the first computation information X by which a product of the first public information Y is to be computed and the fourth secret information "u" securely managed by the second device B so that the product of the first computation information X and the fourth secret information "u" becomes the second secret information "x". The second device B computes the first public product $X^T Y$ being the product of the first computation information X and the first public information Y. The second device B transmits the first public product $X^T Y$ to the first device A. The first device A receives the first public product $X^T Y$ from the second device B. In the computing system 10, the first public product $X^T Y$, the third secret information "v", and the fourth secret information "u" are used to compute the secret product $x^T y$ being the product of the first secret information "y" and the second secret information "x" with the first secret information "y" and the second secret information "x" being securely managed. Thus, the first secret information "y" securely managed by the first device A and the second secret information "x" securely managed by the second device B are not directly transmitted, and hence security in computing the secret product $x^T y$ is enhanced. Even when a third party acquires information exchanged between the first device A and the second device B, the third party cannot identify the first secret information "y" and the second secret information "x", and hence it is possible to reduce a risk that the first secret information "y" and the second secret information "x" may leak to the third party.

Further, the first device A computes the second public product $(X^T Y) \cdot v$ being the product of the first public product $X^T Y$ and the third secret information "v". The first device A transmits the second public product $X^T Y v$ to the second device B. The second device B receives the second public product $X^T Y v$ from the first device A. The second device B computes the secret product $x^T y = u^T \cdot (X^T Y v)$ based on the fourth secret information "u" and the second public product $X^T Y v$. Thus, the security in computing the secret product $x^T y$ by the second device B is enhanced. Even when a third party acquires the first public product $X^T Y$ and the second public product $X^T Y v$, it is not possible solely thereby to identify the first secret information "y" and the second secret information "x", and hence it is possible to reduce the risk that the first secret information "y" and the second secret information "x" may leak to the third party.

Further, the computing system 10 acquires the first public information Y and the third secret information "v" based on at least one random number. Thus, even when a third party acquires the first public information Y and the third secret information "v", those pieces of information are information based on the random number and cannot be used to identify the first secret information "y" and the second secret information "x", and hence it is possible to reduce the risk that the first secret information "y" and the second secret information "x" may leak to the third party.

Further, the first device A acquires the first part Y' being a part of the first public information Y based on the first random number. The first device A acquires the third secret information "v" based on the second random number. The first device A acquires the second part y' being a remaining part of the first public information Y based on the first part Y' and the third secret information "v". Thus, the first public information Y and the third secret information "v" can both include random number elements, thereby further enhancing the security.

Further, the second device B acquires the first computation information X and the fourth secret information "u" based on at least one random number. Thus, even when a third party acquires the first computation information X and the fourth secret information "u", those pieces of information are information based on the random number and cannot be used to identify the first secret information "y" and the second secret information "x", and hence it is possible to reduce the risk that the first secret information "y" and the second secret information "x" may leak to the third party.

Further, the second device B acquires the third part X' being a part of the first computation information X based on the third random number. The second device B acquires the fourth secret information "u" based on the fourth random number. The second device B acquires the fourth part x' being a remaining part of the first computation information X based on the third part X' and the fourth secret information "u". Thus, the first computation information X and the fourth secret information "u" can both include e random number elements, thereby further enhancing the security.

Further, the first secret information "y" and the second secret information "x" each have a vector format. The first public information Y, the third secret information "v", the first computation information X, and the fourth secret information "u" each have a matrix format. The secret product $x^T y$ is an inner product. This enables the computing system 10 to compute the inner product of the vectors without transmitting the vectors to be kept secret between the first device A and the second device B.

Further, the second device B requires higher security than the first device A. The second device B can compute the first public product $X^T Y$ so that the number of rows of the second secret information "x" and the number of rows of the first public product $X^T Y$ differ from each other. This enables the computing system 10 to handle even such a requirement that the second device B transmit or receive information by changing the actual number of rows thereof, thereby being capable of satisfying security standard required of the second device B.

Further, the first secret information "y" and the second secret information "x" each have a vector format. The first public information Y, the third secret information "v", the first computation information X, the fourth secret information "u", the first part Y', and the second part y' each have a matrix format. The secret product $x^T y$ is an inner product. This enables the computing system 10 to compute the inner product of the vectors without transmitting the vectors to be kept secret between the first device A and the second device B.

Further, the first secret information "y" and the second secret information "x" each have a vector format, and the first public information Y, the third secret information "v", the first computation information X, the fourth secret information "u", the third part X', and the fourth part x' each have a matrix format. The secret product $x^T y$ is an inner product. This enables the computing system 10 to compute the inner product of the vectors without transmitting the vectors to be kept secret between the first device A and the second device B.

Further, in the computing system 10, the plurality of devices including the first device A, the second device B, and the other device can communicate to/from one another. The second device B requires relatively high security among the plurality of devices. In the computing system 10, even when relatively high security is required of the second device B, it is possible to compute the inner product of the vectors without transmitting the vectors to be kept secret between the first device A and the second device B, thereby being capable of satisfying security standard required of the second device B.

Further, in the computing system 10, the training of the learning model M in the federated learning is executed based on the secret product $x^T y$. Thus, the security at the time of training in the federated learning is enhanced.

Further, the first device A computes the first secret information "y" in course of the training of the first learning model AM in the federated learning. The second device B computes the second secret information "x" in course of the training of the second learning model BM in the federated learning. Thus, the security at the time of training in the federated learning is enhanced.

Further, the learning model M is a model in the stacking learning for executing predetermined estimation based on the estimation result of each of a plurality of other learning models M. Thus, the security at the time of training in the stacking learning is enhanced.

Further, the first secret information "y" is information relating to each of the plurality of users in the first service. The second secret information "x" is information relating to each of the plurality of users in the second service. In the computing system 10, it is possible to compute the product while securely managing the information relating to the users, and hence it is possible to reduce the risk that the information relating to the users may leak.

Further, the user identification information on each of the plurality of users in the first service and the user identification information on each of the plurality of users in the second service are the same. This facilitates identification of which user relates to the information transmitted between the first device A and the second device B.

5. Functions in Second Embodiment

Next, the second embodiment being another embodiment of the computing system 10 is described. In the computing system 10 according to the second embodiment, the first device A computes the inner product $x^T y$. Description is omitted regarding the same points as those of the first embodiment.

Figure 8:
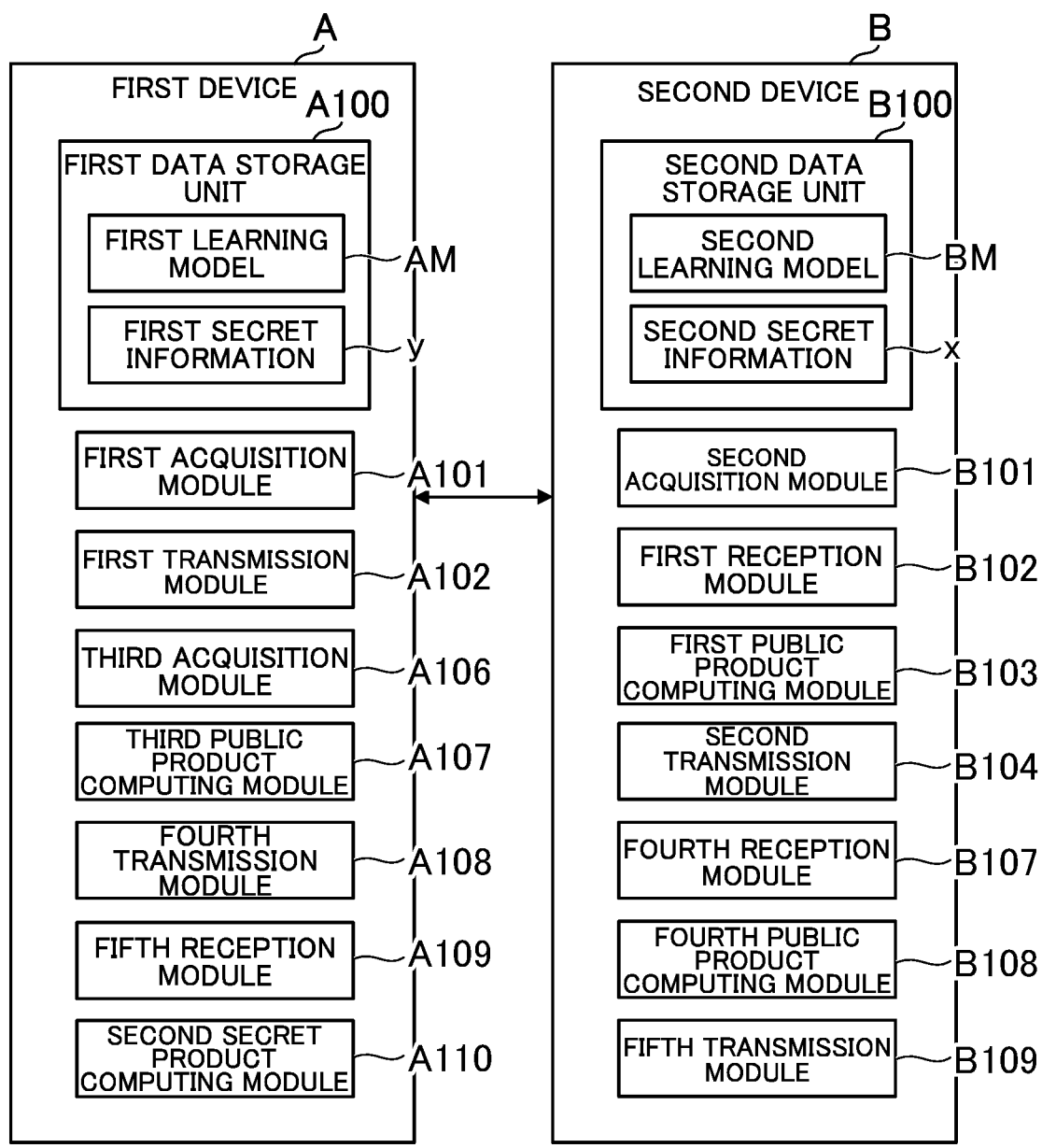
FIG. 8 is a diagram for illustrating an example of functions implemented by a computing system according to a second embodiment of the present disclosure.

FIG. 8 is a diagram for illustrating an example of functions implemented by the computing system 10 according to the second embodiment. For example, the first device A includes a third acquisition module A106, a third public product computing module A107, a fourth transmission module A108, a fifth reception module A109, and a second secret product computing module A110. The third acquisition module A106, the third public product computing module A107, the fourth transmission module A108, the fifth reception module A109, and the second secret product computing module A110 are each implemented by the control unit A11. The second device B includes a fourth reception module B107, a fourth public product computing module B108, and a fifth transmission module B109. The fourth reception module B107, the fourth public product computing module B108, and the fifth transmission module B109 are each implemented by the control unit B11.

Figure 9:
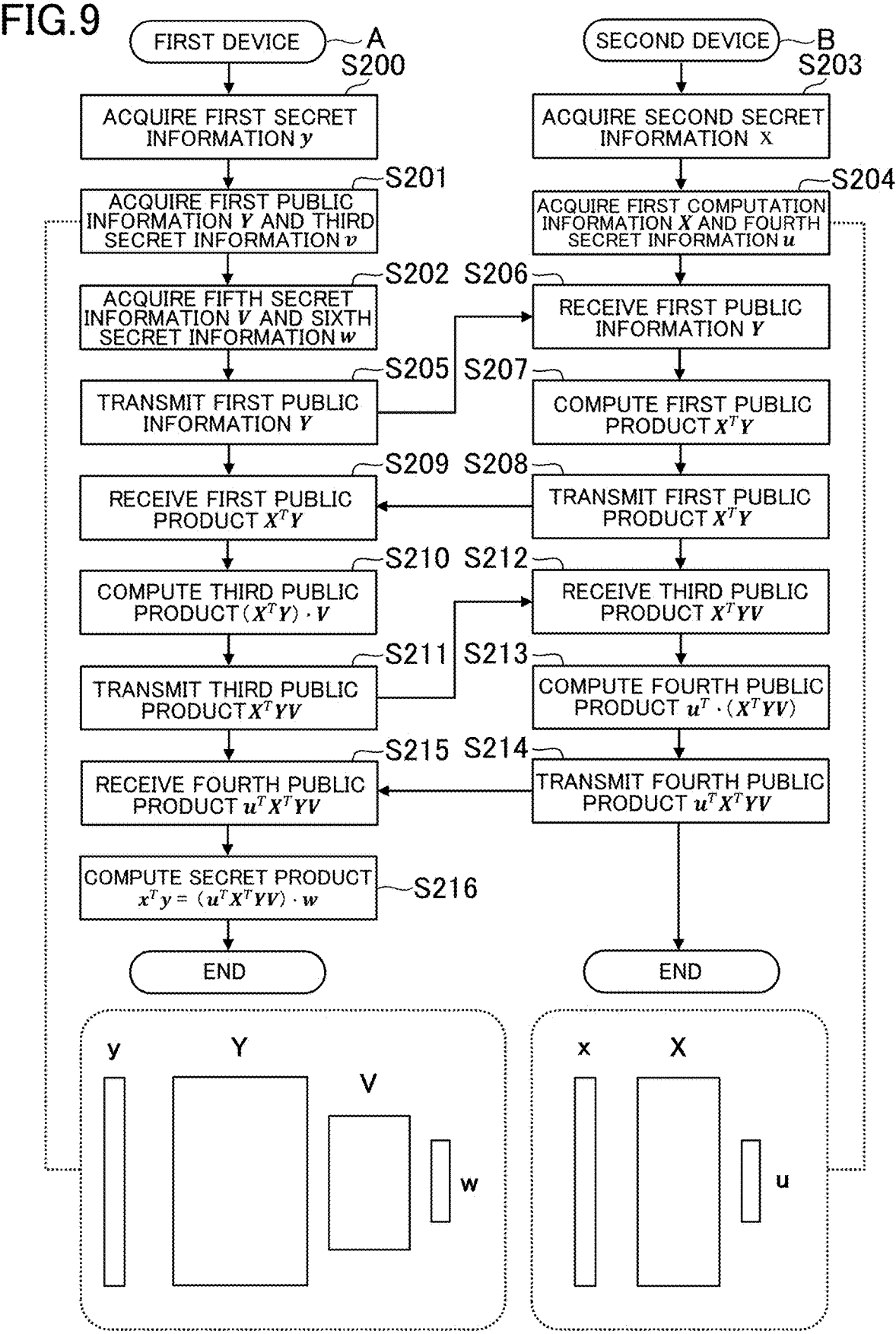
FIG. 9 is a diagram for illustrating an example of processing executed by the computing system according to the second embodiment.

FIG. 9 is a diagram for illustrating an example of processing executed by the computing system 10 according to the second embodiment. Processing steps of Step S200, Step S201, Step S203, and Step S204 are the same as the processing steps of from Step S100 to Step S103, respectively.

[Third Acquisition Module]

The third acquisition module A106 of the first device A acquires fifth secret information V and sixth secret information "w" that are securely managed by the first device A so that a product of the fifth secret information V and the sixth secret information "w" becomes the third secret information "v" (Step S202). For example, the third acquisition module A106 may acquire the fifth secret information V and the sixth secret information "w" based on at least one random number by the same method as that of the first acquisition module A101. The computing method performed in this case is as described in the processing of the first acquisition module A101.

In the second embodiment, a case in which the third acquisition module A106 acquires the fifth secret information V and the sixth secret information "w" by computing the fifth secret information V and the sixth secret information "w" by itself is taken as an example. Thus, acquiring the fifth secret information V and the sixth secret information "w" has the same meaning as that of computing the fifth secret information V and the sixth secret information "w". The third acquisition module A106 may also acquire the fifth secret information V and the sixth secret information "w" that have been externally computed, instead of computing the fifth secret information V and the sixth secret information "w" by itself. In this case, the first device A has a function of computing the fifth secret information V and the sixth secret information "w" separately from the third acquisition module A106. A computing method performed by this function may be the same as a method described below.

In the second embodiment, a case in which the fifth secret information V and the sixth secret information "w" each have a matrix format is taken as an example, but each of the fifth secret information V and the sixth secret information "w" may be any information based on which the product can be computed, and is not limited to the matrix format. For example, the fifth secret information V and the sixth secret information "w" each may be one numerical value, a plurality of numerical values, a matrix, an array, a data frame, or other information. A case in which, when the third acquisition module A106 acquires the fifth secret information V and the sixth secret information "w" by the same method as that of the first acquisition module A101, a part corresponding to each of the first part Y' and the second part y' described in the first embodiment has a matrix format is taken as an example, but another format may be employed. The third acquisition module A106 may acquire the fifth secret information V and the sixth secret information "w" without being based on the random number. The computing method for the fifth secret information V and the sixth secret information "w" performed in this case may be the same as the computing method for the first public information Y and the third secret information "v" performed without being based on the random number.

[Third Public Product Computing Module]

The subsequent processing steps of from Step S205 to Step S209 are the same as the processing steps of from Step S104 to Step S108, respectively. The third public product computing module A107 of the first device A computes a third public product $(X^T Y) \cdot V$ being a product of the first public product $X^T Y$ and the fifth secret information V (Step S210). In Step S210, the third public product computing module A107 may compute the product of the first public product $X^T Y$ and the fifth secret information V based on a publicly known computing method for computing a product of matrices.

[Fourth Transmission Module]

The fourth transmission module A108 of the first device A transmits the third public product $X^T YV$ to the second device B (Step S211). The value $X^T YV$ has the same meaning as that of $(X^T Y) \cdot V$ and represents a computation result of $(X^T Y) \cdot V$. In the second embodiment, a case in which the fourth transmission module encrypts the third public product $X^T YV$ based on a A108 predetermined encryption algorithm and then transmits the encrypted third public product $X^T YV$ to the second device B is taken as an example, but the fourth transmission module A108 may transmit the third public product $X^T YV$ in plaintext to the second device B without encrypting the third public product $X^T YV$.

[Fourth Reception Module]

The fourth reception module B107 of the second device B receives the third public product $X^T YV$ from the first device A (Step S212). In the second embodiment, the third public product $X^T YV$ is encrypted, and hence the fourth reception module B107 decrypts the third public product $X^T YV$ received from the first device A. When the third public product $X^T YV$ is transmitted in plaintext, the fourth reception module B107 does not perform the decryption.

[Fourth Public Product Computing Module]

The fourth public product computing module B108 computes a fourth public product $u^T \cdot (X^T YV)$ based on the fourth secret information "u" and the third public product $X^T YV$ (Step S213). In Step S213, the fourth public product computing module B108 may compute a product of the fourth secret information "u" and the third public product $X^T YV$ based on a publicly known computing method for computing a product of matrices.

[Fifth Transmission Module]

The fifth transmission module B109 of the second device B transmits the fourth public product $u^T X^T YV$ to the first device A (Step S214). The value $u^T X^T YV$ has the same meaning as that of $u^T \cdot (X^T YV)$, and represents a computation result of $u^T \cdot (X^T YV)$. In the second embodiment, a case in which the fifth transmission module B109 encrypts the fourth public product $u^T X^T YV$ based on a predetermined encryption algorithm and then transmits the encrypted fourth public product $u^T X^T YV$ to the second device B is taken as an example, but the fifth transmission module B109 may transmit the fourth public product $u^T X^T YV$ in plaintext to the second device B without encrypting the fourth public product $u^T X^T YV$.

[Fifth Reception Module]

The fifth reception module A109 of the first device A receives the fourth public product $u^T X^T YV$ from the second device B (Step S215). In the second embodiment, the fourth public product $u^T X^T YV$ is encrypted, and hence the fifth reception module A109 decrypts the fourth public product $u^T X^T YV$ received from the first device A. When the fourth public product $u^T X^T YV$ is transmitted in plaintext, the fifth reception module A109 does not perform the decryption.

[Second Secret Product Computing Module]

The second secret product computing module A110 of the first device A computes the secret product $x^T y \equiv (u^T X^T YV) \cdot w$ based on the fourth public product $u^T X^T YV$ and the sixth secret information "w" (Step S216). In the second embodiment, a case in which the secret product $x^T y$ is an inner product of the fourth public product $u^T X^T YV$ and the sixth secret information "w" is taken as an example, but the second secret product computing module A110 may compute a product of the fourth public product $u^T X^T YV$ and the sixth secret information "w" in place of the inner product. In Step S216, the second secret product computing module A110 may compute the inner product of the fourth public product $u^T X^T YV$ and the sixth secret information "w" based on a publicly known computing method for computing an inner product of matrices. The right-hand side of the mathematical expression in Step S216 corresponds to a product of: the first public information Y, the fifth secret information V, and the sixth secret information "w" the product of which is the first secret information "y"; and the fourth secret information "u" and the first computation information X the product of which is the second secret information "x", and hence the first device A can compute the same value as the inner product of the first secret information "y" and the second secret information "x".

6. Summary of Second Embodiment

The first device A in the second embodiment acquires the fifth secret information V and the sixth secret information "w" that are securely managed by the first device A so that the product of the fifth secret information V and the sixth secret information "w" becomes the third secret information "v". The first device A computes the third public product $(X^T Y) \cdot V$ being the product of the first public product $X^T Y$ and the fifth secret information V. The first device A transmits the third public product $X^T YV$ to the second device B. The second device B receives the third public product $X^T YV$ from the first device A. The second device B computes the fourth public product $u^T \cdot (X^T YV)$ based on the fourth secret information "u" and the third public product $X^T YV$. The second device B transmits the fourth public product $u^T X^T YV$ to the first device A. The first device A receives the fourth public product $u^T X^T YV$ from the second device B. The first device A computes the secret product $x^T y \equiv (u^T X^T YV) \cdot w$ based on the fourth public product $u^T X^T YV$ and the sixth secret information "w". Thus, the security in computing the secret product $x^T y$ by the first device A is enhanced. Even when a third party acquires the first public product $X^T Y$, the third public product $X^T YV$, and the fourth public product $u^T X^T YV$, it is not possible solely thereby to identify the first secret information "y" and the second secret information "x", and hence it is possible to reduce the risk that the first secret information "y" and the second secret information "x" may leak to the third party.

Further, the first secret information "y" and the second secret information "x" each have a vector format. The first public information Y, the third secret information "v", the first computation information X, the fourth secret information "u", the fifth secret information V, and the sixth secret information "w" each have a matrix format. The secret product $x^T y$ is an inner product. This enables the computing system 10 to compute the inner product of the vectors without transmitting the vectors to be kept secret between the first device A and the second device B.

7. Modification Example

The present disclosure is not limited to the embodiments described above. Modifications can be made as appropriate without departing from the gist of the present disclosure. For example, the computing system 10 may have both the functions described in the first embodiment and the functions described in the second embodiment. The computing system 10 can be applied to another situation different from the federated learning. The computing system 10 can be applied to a situation in which the product of a plurality of pieces of secret information is computed for some purpose.

For example, it suffices that the functions described as being implemented by the first device A or the second device B are implemented by at least one computer in the computing system 10, and the functions may be shared by a plurality of computers. In this case, the sharing of each function may be achieved by each of the plurality of computers transmitting its own processing result to another computer.

8. Supplementary Notes

For example, the computing system may have configurations as described below.

(1)
A computing system, including:
a first device configured to securely manage first secret information; and
a second device configured to securely manage second secret information,
wherein the first device includes:
 a first acquisition module configured to acquire first public information to be disclosed to the second device and third secret information securely managed by the first device so that a product of the first public information and the third secret information becomes the first secret information; and
 a first transmission module configured to transmit the first public information to the second device;
wherein the second device includes:
 a first reception module configured to receive the first public information from the first device;
 a second acquisition module configured to acquire first computation information by which a product of the first public information is to be computed and fourth secret information securely managed by the second device so that a product of the first computation information and the fourth secret information becomes the second secret information;
 a first public product computing module configured to compute a first public product being the product of the first computation information and the first public information; and
 a second transmission module configured to transmit the first public product to the first device,
wherein the first device further includes a second reception module configured to receive the first public product from the second device, and
wherein the first public product, the third secret information, and the fourth secret information are used to compute a secret product being a product of the first secret information and the second secret information with the first secret information and the second secret information being securely managed.

(2)
The computing system according to Item (1),
wherein the first device further includes:
 a second public product computing module configured to compute a second public product being a product of the first public product and the third secret information; and
 a third transmission module configured to transmit the second public product to the second device, and
wherein the second device further includes:
 a third reception module configured to receive the second public product from the first device; and
 a first secret product computing module configured to compute the secret product based on the fourth secret information and the second public product.

(3)
The computing system according to Item (1) or (2),
wherein the first device includes:
 a third acquisition module configured to acquire fifth secret information and sixth secret information that are securely managed by the first device so that a product of the fifth secret information and the sixth secret information becomes the third secret information;
 a third public product computing module configured to compute a third public product being a product of the first public product and the fifth secret information; and
 a fourth transmission module configured to transmit the third public product to the second device,
wherein the second device further includes:
 a fourth reception module configured to receive the third public product from the first device;
 a fourth public product computing module configured to compute a fourth public product based on the fourth secret information and the third public product; and
 a fifth transmission module configured to transmit the fourth public product to the first device, and
wherein the first device further includes:
 a fifth reception module configured to receive the fourth public product from the second device; and a second secret product computing module configured to compute the secret product based on the fourth public product and the sixth secret information.

(4)

The computing system according to any one of Items (1) to (3), wherein the first acquisition module is configured to acquire the first public information and the third secret information based on at least one random number.

(5)

The computing system according to Item (4), wherein the first acquisition module is configured to:
acquire a first part being a part of the first public information based on a first random number;
acquire the third secret information based on a second random number; and
acquire a second part being a remaining part of the first public information based on the first part and the third secret information.

(6)

The computing system according to any one of Items (1) to (5), wherein the second acquisition module is configured to acquire the first computation information and the fourth secret information based on at least one random number.

(7)

The computing system according to Item (6), wherein the second acquisition module is configured to:
acquire a third part being a part of the first computation information based on a third random number;
acquire the fourth secret information based on a fourth random number; and
acquire a fourth part being a remaining part of the first computation information based on the third part and the fourth secret information.

(8)

The computing system according to any one of Items (1) to (7),
wherein the first secret information and the second secret information each have a vector format,
wherein the first public information, the third secret information, the first computation information, and the fourth secret information each have a matrix format, and
wherein the secret product is an inner product.

(9)

The computing system according to Item (8),
wherein the second device requires higher security than the first device, and
wherein the first public product computing module is configured to compute the first public product so that the number of rows of the second secret information and the number of rows of the first public product differ from each other.

(10)

The computing system according to Item (3),
wherein the first secret information and the second secret information each have a vector format,
wherein the first public information, the third secret information, the first computation information, the fourth secret information, the fifth secret information, and the sixth secret information each have a matrix format, and
wherein the secret product is an inner product.

(11)

The computing system according to Item (5),
wherein the first secret information and the second secret information each have a vector format,
wherein the first public information, the third secret information, the first computation information, the fourth secret information, the first part, and the second part each have a matrix format, and
wherein the secret product is an inner product.

(12)

The computing system according to Item (7),
wherein the first secret information and the second secret information each have a vector format,
wherein the first public information, the third secret information, the first computation information, the fourth secret information, the third part, and the fourth part each have a matrix format, and
wherein the secret product is an inner product.

(13)

The computing system according to any one of Items (1) to (12),
wherein the computing system enables communication among a plurality of devices including the first device, the second device, and another device, and
wherein the second device requires relatively high security among the plurality of devices.

(14)

The computing system according to any one of Items (1) to (13), wherein the computing system is configured to execute training of a learning model in federated learning based on the secret product.

(15)

The computing system according to Item (14),
wherein the first device is configured to compute the first secret information in course of the training of a first learning model in the federated learning, and
wherein the second device is configured to compute the second secret information in course of the training of a second learning model in the federated learning.

(16)

The computing system according to Item (14) or (15), wherein the learning model is a model in stacking learning for executing predetermined estimation based on an estimation result of each of a plurality of other learning models.

(17)

The computing system according to any one of Items (1) to (16),
wherein the first secret information is information relating to each of a plurality of users in a first service, and
wherein the second secret information is information relating to each of the plurality of users in a second service.

(18)

The computing system according to Item (17), wherein user identification information on each of the plurality of users in the first service and user identification information on each of the plurality of users in the second service are the same.

While there have been described what are at present considered to be certain embodiments of the invention, it will be understood that various modifications may be made thereto, and it is intended that the appended claims cover all such modifications as fall within the true spirit and scope of the invention.

What is claimed is:
1. A computing system, comprising:
a first computer configured to securely manage first secret information; and
a second computer configured to securely manage second secret information, wherein the first computer is configured to:
  acquire first public information to be disclosed to the second computer and third secret information securely managed by the first computer wherein a product of the first public information and the third secret information becomes the first secret information; and
  transmit the first public information to the second computer;
wherein the second computer is configured to:
  receive the first public information from the first computer;
  acquire first computation information and fourth secret information securely managed by the second computer wherein a product of the first computation information and the fourth secret information becomes the second secret information;
  compute a first public product wherein the first public product being the product of the first computation information and the first public information; and
  transmit the first public product to the first computer,
wherein the first computer is configured to receive the first public product from the second computer,
wherein the first public product, the third secret information, and the fourth secret information are used to compute a secret product wherein the secret product being a product of the first secret information and the second secret information with the first secret information and the second secret information being securely managed;
wherein the computing system is configured to execute training of a learning model in federated learning based on the secret product;
wherein the first computer is configured to compute the first secret information in course of the training of a first learning model in the federated learning, and
wherein the second computer is configured to compute the second secret information in course of the training of a second learning model in the federated learning.

2. The computing system according to claim 1,
wherein the first computer is configured to:
  compute a second public product wherein the second public product being a product of the first public product and the third secret information; and
  transmit the second public product to the second computer, and
wherein the second computer is configured to:
  receive the second public product from the first computer; and
  compute the secret product based on the fourth secret information and the second public product.

3. The computing system according to claim 1,
wherein the first computer is configured to:
  acquire fifth secret information and sixth secret information that are securely managed by the first computer wherein a product of the fifth secret information and the sixth secret information becomes the third secret information;
  compute a third public product wherein the third public product being a product of the first public product and the fifth secret information; and
  transmit the third public product to the second computer,
wherein the second computer is configured to:
  receive the third public product from the first computer;
  compute a fourth public product based on the fourth secret information and the third public product; and
  transmit the fourth public product to the first computer, and
wherein the first computer is configured to:
  receive the fourth public product from the second computer; and
  compute the secret product based on the fourth public product and the sixth secret information.

4. The computing system according to claim 1, wherein the first computer is configured to acquire the first public information and the third secret information based on at least one random number.

5. The computing system according to claim 4, wherein the first computer is configured to:
  acquire a first part wherein the first part being a part of the first public information based on a first random number;
  acquire the third secret information based on a second random number; and
  acquire a second part wherein the second part being a remaining part of the first public information based on the first part and the third secret information.

6. The computing system according to claim 1, wherein the second computer is configured to acquire the first computation information and the fourth secret information based on at least one random number.

7. The computing system according to claim 6, wherein the second computer is configured to:
  acquire a third part wherein the third part being a part of the first computation information based on a third random number;
  acquire the fourth secret information based on a fourth random number; and
  acquire a fourth part wherein the fourth part being a remaining part of the first computation information based on the third part and the fourth secret information.

8. The computing system according to claim 1,
wherein the first secret information and the second secret information each have a vector format,
wherein the first public information, the third secret information, the first computation information, and the fourth secret information each have a matrix format, and
wherein the secret product comprises an inner product.

9. The computing system according to claim 8,
wherein the second computer requires higher security than the first computer; and
wherein the second computer is configured to compute the first public product wherein the number of rows of the second secret information and the number of rows of the first public product differ from each other.

10. The computing system according to claim 3,
wherein the first secret information and the second secret information each have a vector format,
wherein the first public information, the third secret information, the first computation information, the fourth secret information, the fifth secret information, and the sixth secret information each have a matrix format, and
wherein the secret product comprises an inner product.

11. The computing system according to claim 5,
wherein the first secret information and the second secret information each have a vector format,
wherein the first public information, the third secret information, the first computation information, the fourth secret information, the first part, and the second part each have a matrix format, and wherein the secret product comprises an inner product.

12. The computing system according to claim 7,
wherein the first secret information and the second secret information each have a vector format,
wherein the first public information, the third secret information, the first computation information, the fourth secret information, the third part, and the fourth part each have a matrix format, and
wherein the secret product comprises an inner product.

13. The computing system according to claim 1,
wherein the computing system enables communication among a plurality of computers including the first computer, the second computer, and another computer, and
wherein the second computer requires relatively high security among the plurality of computers.

14. The computing system according to claim 1,
wherein the first secret information comprises information relating to each of a plurality of users in a first service, and
wherein the second secret information comprises information relating to each of the plurality of users in a second service.

15. The computing system according to claim 14, wherein user identification information on each of the plurality of users in the first service and user identification information on each of the plurality of users in the second service are the same.

16. A computing system, comprising:
a first computer configured to securely manage first secret information; and
a second computer configured to securely manage second secret information,
wherein the first computer is configured to:
    acquire first public information to be disclosed to the second computer and third secret information securely managed by the first computer wherein a product of the first public information and the third secret information becomes the first secret information; and
    transmit the first public information to the second computer;
wherein the second computer is configured to:
    receive the first public information from the first computer;
    acquire first computation information and fourth secret information securely managed by the second computer wherein a product of the first computation information and the fourth secret information becomes the second secret information;
    compute a first public product wherein the first public product being the product of the first computation information and the first public information; and
    transmit the first public product to the first computer,
wherein the first computer is configured to receive the first public product from the second computer,
wherein the first public product, the third secret information, and the fourth secret information are used to compute a secret product wherein the secret product being a product of the first secret information and the second secret information with the first secret information and the second secret information being securely managed;
wherein the computing system is configured to execute training of a learning model in federated learning based on the secret product; and
wherein the learning model comprises a model in stacking learning for executing predetermined estimation based on an estimation result of each of a plurality of other learning models.

17. A computing method, which is executed by a first computer configured to securely manage first secret information and a second computer configured to securely manage second secret information, the computing method comprising:
acquiring, by the first computer, first public information to be disclosed to the second computer and third secret information securely managed by the first computer wherein a product of the first public information and the third secret information becomes the first secret information;
transmitting, by the first computer, the first public information to the second computer;
receiving, by the second computer, the first public information from the first computer;
acquiring, by the second computer, first computation information and fourth secret information securely managed by the second computer so wherein a product of the first computation information and the fourth secret information becomes the second secret information;
computing, by the second computer, a first public product wherein the first public product being the product of the first computation information and the first public information;
transmitting, by the second computer, the first public product to the first computer;
receiving, by the first computer, the first public product from the second computer; and
computing, based on the first public product, the third secret information, and the fourth secret information, a secret product wherein the secret product being a product of the first secret information and the second secret information with the first secret information and the second secret information being securely managed;
executing training of a learning model in federated learning based on the secret product;
computing, by the first computer, the first secret information in course of the training of a first learning model in the federated learning, and
wherein the second computer is configured to compute the second secret information in course of the training of a second learning model in the federated learning.

* * * * *